United States Patent
Gammel et al.

(10) Patent No.: US 10,354,065 B2
(45) Date of Patent: Jul. 16, 2019

(54) METHOD FOR PROTECTING DATA AND DATA PROCESSING DEVICE

(71) Applicant: Infineon Technologies AG, Neubiberg (DE)

(72) Inventors: Berndt Gammel, Markt-Schwaben (DE); Stefan Heiss, Bobingen (DE); Markus Rau, Augsburg (DE)

(73) Assignee: Infineon Technologies AG, Neubiberg (DE)

(*) Notice: Subject to any disclaimer, the term of this patent is extended or adjusted under 35 U.S.C. 154(b) by 323 days.

(21) Appl. No.: 15/333,205

(22) Filed: Oct. 25, 2016

(65) Prior Publication Data

US 2017/0116437 A1    Apr. 27, 2017

(30) Foreign Application Priority Data

Oct. 27, 2015 (DE) .................. 10 2015 118 269

(51) Int. Cl.
*H04L 29/06* (2006.01)
*G06F 21/55* (2013.01)
*H04L 9/00* (2006.01)
*H04L 9/08* (2006.01)

(52) U.S. Cl.
CPC ............ *G06F 21/556* (2013.01); *H04L 9/003* (2013.01); *H04L 9/0894* (2013.01); *H04L 2209/046* (2013.01)

(58) Field of Classification Search
CPC .............. G06F 21/556; G06F 16/2465; G06F 11/3476; G06F 21/57; G06F 21/577; G06F 21/54; G06F 21/645; H04L 9/0894; H04L 9/003; H04L 2209/046
See application file for complete search history.

(56) References Cited

U.S. PATENT DOCUMENTS

| | | | |
|---|---|---|---|
| 6,948,067 B2 | 9/2005 | Hawkes et al. | |
| 6,950,517 B2 | 9/2005 | Hawkes et al. | |
| 8,190,665 B2 | 5/2012 | Stribaek et al. | |
| 9,177,153 B1* | 11/2015 | Perrig | G06F 21/57 |
| 9,544,131 B2* | 1/2017 | Karroumi | G06F 7/727 |
| 2005/0240582 A1* | 10/2005 | Hatonen | G06F 17/30539 |
| 2015/0006913 A1 | 1/2015 | Daniel et al. | |
| 2015/0172042 A1 | 6/2015 | Karroumi et al. | |

FOREIGN PATENT DOCUMENTS

EP      2884387 A1    6/2015

* cited by examiner

*Primary Examiner* — Amir Mehrmanesh
(74) *Attorney, Agent, or Firm* — Viering, Jentschura & Partner MBB

(57) ABSTRACT

According to one embodiment, a method for protecting data is provided comprising receiving a plurality of data symbols, determining a sequence of checksum symbols wherein the checksum symbols are determined to be equal to the checksum symbols of the last iteration of an iterative checksum symbol generation process, wherein the determining of the checksum symbols includes at least one of randomly generating the initial values, randomly determining an order of the data symbols in which the contributions of the data symbols to the checksum symbols are incorporated into the checksum symbols and masking each data symbol and using the masked data symbols as data symbols for determining the checksum symbols and which includes storing at least some of the checksum values as checksum for the data symbols.

20 Claims, 4 Drawing Sheets

METHOD FOR PROTECTING DATA AND DATA PROCESSING DEVICE

CROSS-REFERENCE TO RELATED APPLICATION

This application claims priority to German Patent Application Serial No. 10 2015 118 269.6, which was filed Oct. 27, 2015, and is incorporated herein by reference in its entirety.

TECHNICAL FIELD

The present disclosure relates to methods for protecting data and data processing devices.

BACKGROUND

A chip like it is included in a chip card may process confidential data such as cryptographic keys used for secure transmission. Such data should typically be protected against modification, too. This may for example be achieved by means of an error detection code including the calculation of a checksum. At the same time, however, it is desirable to avoid that an attacker can gain information about the confidential data by exploiting side-channel leakage occurring during the calculation of the checksum.

SUMMARY

According to one embodiment, a method for protecting data is provided including receiving a plurality of data symbols, determining a sequence of checksum symbols wherein the checksum symbols are determined to be equal to the checksum symbols of the last iteration of an iterative checksum symbol generation process in which for the first iteration, the value of the first checksum symbol is given by an initial value of the first checksum symbol plus the value of the first data symbol, the value of each following checksum symbol is given by an initial value for the checksum symbol plus the value of the previous checksum symbol for the first iteration and for each following iteration, the value of each checksum symbol is given by the value of the checksum symbol for the previous iteration plus the value of the previous checksum symbol for the current iteration, wherein the determining of the checksum symbols includes at least one of randomly generating the initial values, randomly determining an order of the data symbols in which the contributions of the data symbols to the checksum symbols are incorporated into the checksum symbols and masking each data symbol and using the masked data symbols as data symbols for determining the checksum symbols and which includes storing at least some of the checksum values as checksum for the data symbols.

According to another embodiment, a data processing device according to the method for protecting data described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
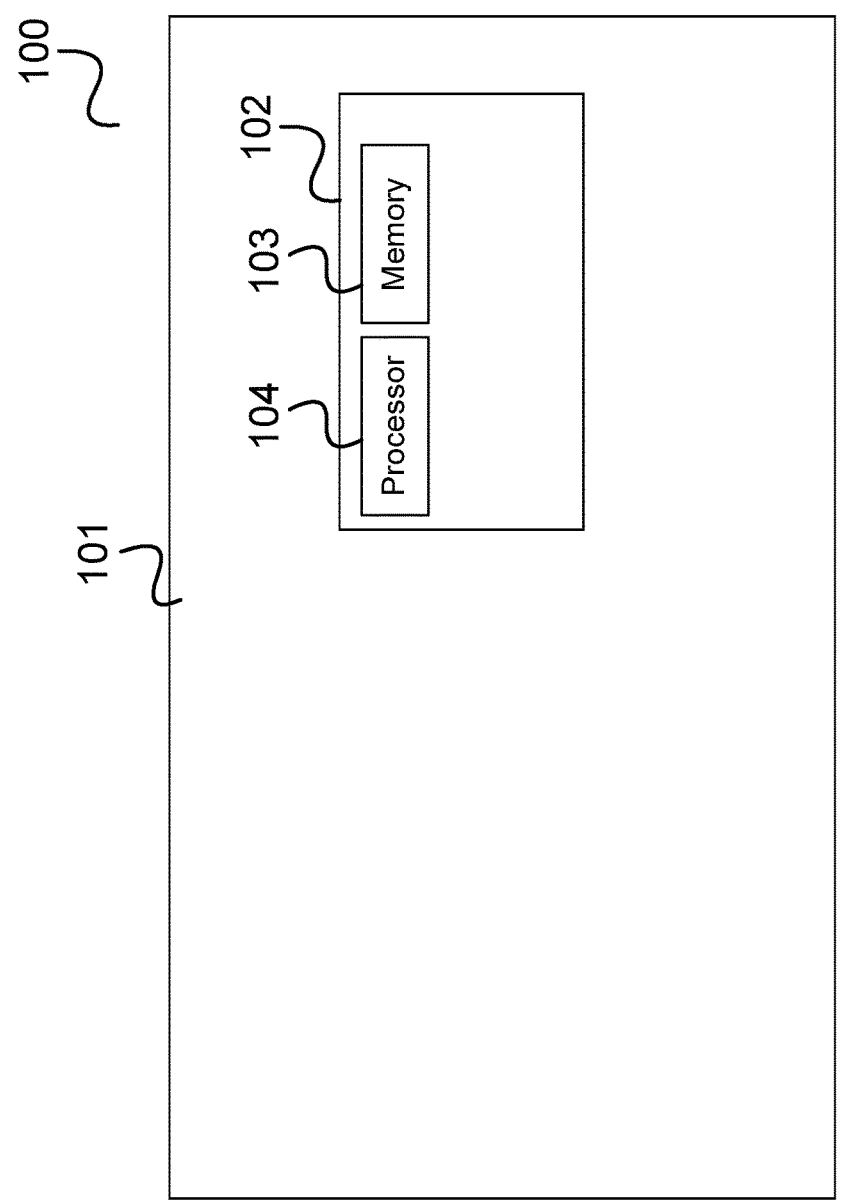
FIG. 1 shows a system with an embedded security subsystem according to an embodiment.

FIG. 1 shows a system 100 according to an embodiment.

The system 100 includes an embedded security subsystem 101 which contains a security controller 102. The security controller includes various data processing components like for example a memory 103 and a data processing unit 104.

A possible embodiment of system 100 could be a chipcard containing a module 101 with a chipcard controller 102.

In a security controller, such as a chipcard controller, data typically needs to be protected against manipulation by malicious attackers. Generally, for this purpose, error detection codes may be used. Depending on the attack scenario these codes are required to have various properties. For example, on the protocol level, if a cryptographically secure protection of data against forgery is required, cryptographic checksums, signatures, or MAC (Message Authentication Code) algorithms are used. On the implementation level, the protection of data against an attacker utilizing probing needles or focused laser beams is typically required. For this, error detection codes for fixed data length (so-called block codes, e.g. error detection codes (EDC)) or codes for variable data length (so-called checksum (CS) codes) are used.

The embodiments described in the following can be seen to be based on checksum codes.

Various properties of a checksum code typically are 1. the minimum code distance
2. the maximum length of the data for which a certain code distance holds
3. the linearity or nonlinearity of the code
4. the size of the digest (i.e. of the checksum field) of the code
5. the computational complexity to compute and check the code (which is relevant on a restricted microcontroller)
6. the eligibility of the code to implement side-channel analysis (SCA) countermeasures against TA (timing analysis), DPA (differential power analysis), EMA (electromagnetic attack), DEMA (differential electromagnetic attack), template attacks, and so forth.

A checksum code may for example be required for protecting secret data such as secret key material, such as the protocol parameter sets for public key cryptography (e.g. ECDSA (Elliptic Curve Digital Signature Algorithm)) or symmetric key sets (e.g. sets of AES (Advanced Encryption Standard) keys), for example used by the chipcard controller 104, against fault attacks.

For such an application, a code may be needed that has a high code distance (item 1 of the above property list) for medium size data blocks, say one kilobyte of data, (item 2). Since secret data is processed the implementation of the code is typically required to be protected against SCA (item 6). Further, it is a strong advantage if the code is nonlinear (item 3) to reduce an advantage of an attacker in the repetition of an attack.

Checksum codes with high code distance and for long data blocks can be systematically constructed, e.g., from BCH or Reed-Solomon codes. However, these codes are linear, they generally require high computational efforts, and they are generally difficult to protect against SCA.

As an alternative, cryptographic hash functions (like MD5, SHA-1, SHA-2, . . . ) provide very strong protection, but they also suffer from being computationally extremely inefficient and hard to protect against SCA. For example, the implementation of a substantial SCA protection into one of the standardized SHA-x algorithms can lead to an additionally performance penalty of a factor of 50 to 500.

There are only a few nonlinear checksum codes that lend themselves to a fast implementation. Examples are the Fletcher-16, Fletcher-32, Adler-32, and the ATN (Aeronautical Telecommunication Network)-32 checksum. Only the last one, ATN-32, provides a code distance which can be considered as large enough (D=4) for data blocks up to about 0.5 kB.

Embodiments described in the following are based on a general class of codes called nonlinear k-fold iterated checksum codes CS(k). It should be noted that the mentioned Fletcher-16, Fletcher-23, Adler-32 and ATN-32 checksums are special cases of this general class of codes. This class of codes is defined in terms of an iteration rule which allows efficiently computing the checksum for a string of data words in sequential order:

A k+1-fold iterated-sum checksum $CS_{k+1}$ of a N-length data vector $d=(d_0, d_1, \ldots, d_{N-1})$ is defined by the iteration $$s_0^{(i+1)} := s_0^{(i)} + d_i;$$
$$s_1^{(i+1)} := s_1^{(i)} + s_0^{(i+1)};$$
$$\ldots$$
$$s_k^{(i+1)} := s_k^{(i)} + s_{k-1}^{(i+1)};$$

(1)

with i=0, 1, . . . , N−1 an initial values $(s_0^{(0)}, s_1^{(0)}, \ldots s_k^{(0)})=(a_0, a_1, \ldots a_k)$. Here, the operator '+' denotes an addition in some algebraic structure, e.g. integers modulo n for a certain value of n. The checksum value is given by the final vector (i.e. the result vector of the last iteration) $CS_k=(s_0^{(N)}, s_1^{(N)}, \ldots, s_k^{(N)})$ or by a subset of this vector, e.g. $CS_k=(s_i^{(N)}, s_j^{(N)}, \ldots s_m^{(N)})$, for 0≤i, j, . . . , m≤k. In some applications it is convenient not to store the final vector of checksums, but to compute and store a function value of these symbols, $CS'_k=(s'_i^{(N)}, s'_j^{(N)}, \ldots, s'_m^{(N)})=F(s_i^{(N)}, s_j^{(N)}, \ldots s_m^{(N)})$, such that the computation of the checksum over the data symbols AND the appended (or prepended) modified checksum symbols $CS'_k$ yields a constant value, e.g. the all-zero value. As this is usually a trivial mathematical step, we call $CS_k$ as defined above the checksum. The value $CS'_k$ is just considered as an equivalent representation.

Various embodiments can be seen to be based on expressing the contributions to the check sum such that each term corresponding to a single data word $d_n$ (i=0, 1, . . . , N−1) can be added in arbitrary order (wherein $d_n$ is a data word of arbitrary size, e.g. a byte).

It can be shown that the k+1-fold iterated-sum checksum $CS_{k+1}$ can be expressed by sum formulas involving binomial coefficients as:

$$s_j^{(N)} = \sum_{n=0}^{N-1} c_{j,n} d_n + \sum_{i=0}^{j} b_{j,i} a_i = \sum_{n=0}^{N-1} \binom{N-1+j-n}{j} d_n + \sum_{i=0}^{j} \binom{N-1+j-i}{j-i} a_i, \text{ for } j = 0, 1, \ldots, k.$$

(2)

Based on this representation of $CS_{k+1}$ efficient side-channel attack counter measures for this general class of code class can be derived:

a) randomizing the start value (i.e. randomizing the initialization vector $(a_0, a_1, \ldots, a_k)$ of the checksum computation.

b) computing the checksum by accessing the data values in random order.

c) masking the data values with a constant mask during the computation of the checksum.

d) applying an additive secret sharing to the data in the computation of the checksum.

The countermeasures a) to d) can be arbitrarily combined to increase the security level. They can be applied for all iterated checksum algorithms with the structure as given above in the definition (1) of $CS_{k+1}$. This structure includes known algorithms like Fletcher-16, Fletcher-32, ATN-32, and Adler-32, as well as an infinite number of more checksum algorithms.

For example, a checksum (e.g. called Chipcard Checksum CCS-32) may be used which is a 4-fold iterated checksum (i.e. corresponds to $CS_4$ of the above definition) and works on data words the size of a byte d, using integer addition modulo 255 as the addition operation.

Figure 2:
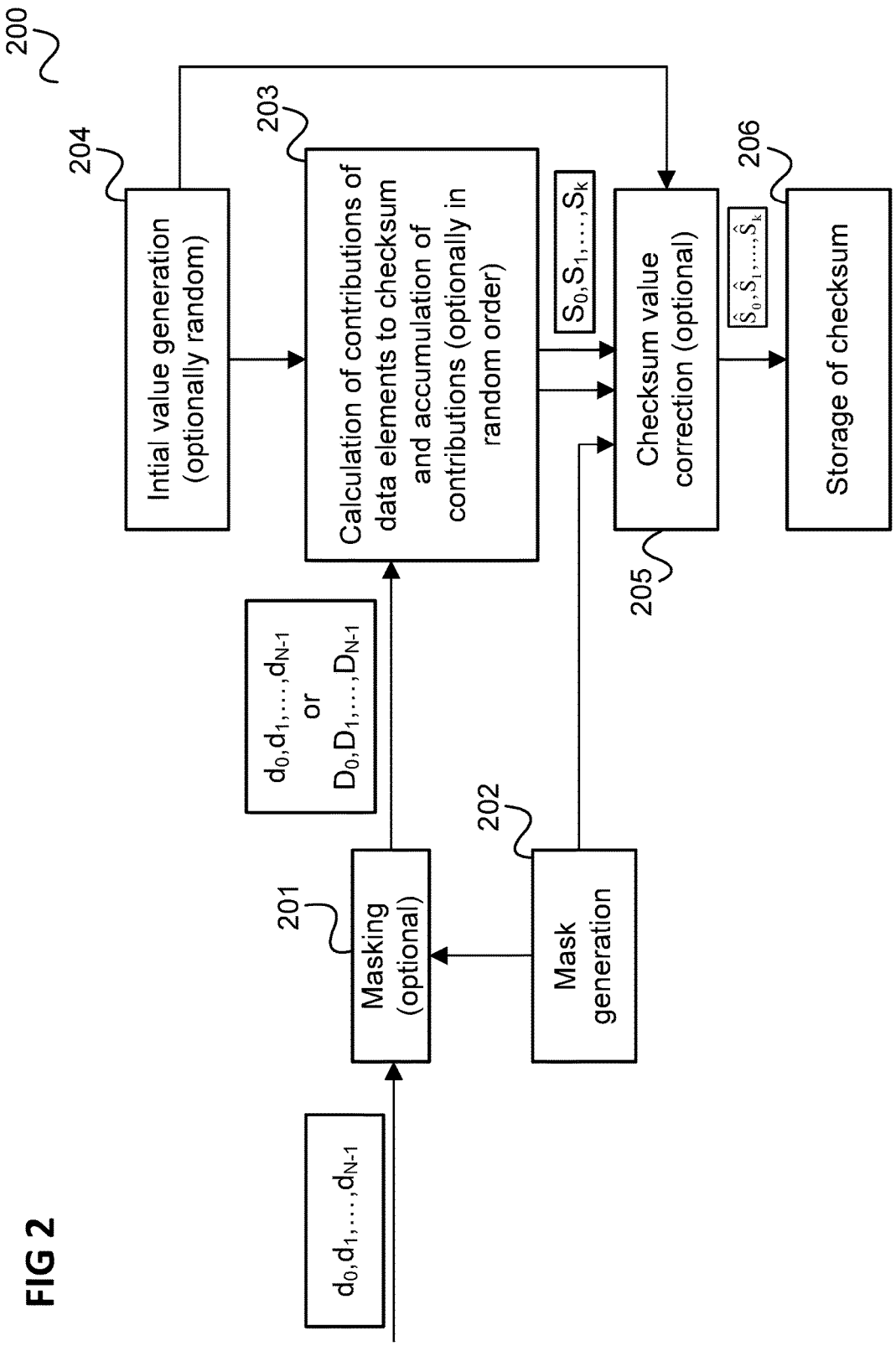
FIG. 2 shows a block diagram illustrating the application of side-channel attack counter measures to the generation of a checksum.

FIG. 2 shows a block diagram 200 illustrating the application of the side-channel attack counter measures a) to d) given above to the generation of a checksum.

The checksum generation is for example performed by a component of the chip card module 102, e.g. the processor 104.

The checksum is generated for a data vector $d=(d_0, d_1, d_{N-1})$. Each data element $d_n$ has a certain size, e.g. one octet of bits (byte) or two bytes, or four bytes. The data vector for example has a length of several hundred bytes. For example, the data vector includes eighth 256-bit AES keys which should be protected against faults. This amounts to 256 byte of data in the data vector. Another example is the protection of security parameters in asymmetric cryptography. For example, for ECDSA such a set contains, e.g., nine elements of the size of the security parameter. For a 256 or 512 bit security parameter this amounts to 288 or 576 byte of information data.

According to various embodiments, the data vector is protected by a checksum (which is for example appended to the data vector), e.g. parity check digits which may be from the same alphabet as the data elements $d_n$ but which may also have a higher range of possible values. For example, a checksum digit (also referred to as checksum symbol) may include two bytes while a data element (also referred to as data symbol) may include a single byte. The data vector together with the checksum (also referred to as digest) forms a codeword.

For implementing the SCA counter measures c) and d), the data vector $d=(d_0, d_1, \ldots, d_{N-1})$ is supplied to a masking block 201.

For SCA counter measure c), the masking block 201 realizes a constant masking of the data, i.e. it generates, for the checksum calculation, masked data $$D_n := (d_n + m), \text{ for } 0 <= n < N$$

where m is a random mask value supplied from a mask source 202 (e.g. a random number generator) 202 and '+' denotes addition in some algebraic structure, e.g. integer addition modulo some selected modulus, i.e. 255.

For SCA counter measure d), the masking block 201 realizes additive secret sharing of the data, i.e., it generates, for checksum shared data $$D_n := (d_n + m_n) \text{ and } D'_n := m_n, \text{ for } 0 <= n < N$$

where $m_n$ is an individual random mask value from the mask source 202 and '+' denotes addition in some algebraic structure, e.g. integer addition modulo some selected modulus.

The masked data vector $D=(D_0, D_1, \ldots, D_{N-1})$ (or the unmasked data vector $d=(d_0, d_1, d_{N-1})$ when no masking is applied) is supplied to the checksum calculation block 203.

The checksum calculation block 203 calculates the vector of checksum data elements $S_0, S_1, \ldots, S_k := s_0^{(N)}, s_1^{(N)}, \ldots s_k^{(N)})$ based on a vector of initial values $(a_0, a_1, \ldots, a_k)$.

For realizing SCA countermeasure b) the vector of initial values $(a_0, a_1, \ldots, a_k)$ may be selected at random, e.g. may be provided by a random initial value source 204, e.g. a random number generator which provides a random value for each initial value (e.g. within a range of 0 to 254 for modulus 255).

For realizing SCA countermeasure a), given a data element $d_n$ and its index n, its contribution to the sums $S_0, S_1, S_2, S_3, \ldots$ are computed individually.

For example, according to the representation of $CS_{k+1}$ using binominal coefficients as given above, for the calculation of $s_j^{(N)}$, the terms $$\sum_{n=0}^{N-1} \binom{N-1+j-n}{j} d_n \text{ for}$$

$$n = 0, \ldots, N-1 \left( \text{or } \binom{N-1+j-n}{j} D_n \right)$$

if masking is applied) are calculated in random order of the value of n (i.e. for example from $n_0, n_1, \ldots, n_{N-1}$. $\{n_0, n_1, \ldots, n_{N-1}\}$ is a permutation of $\{0, \ldots, N-1\}$ i.e. all indexes from 0 to N−1 are covered in a random order) and accumulated to provide $$\sum_{n=0}^{N-1} \binom{N-1+j-n}{j} d_n \text{ or } \sum_{n=0}^{N-1} \binom{N-1+j-n}{j} D_n,$$

respectively.

In other words, the sum $$\sum_{n=0}^{N-1} \binom{N-1+j-n}{j} d_n \text{ or } \sum_{n=0}^{N-1} \binom{N-1+j-n}{j} D_n$$

can be updated in random order, which provides a strong SPA (Simple Power Analysis) and DPA (Differential Power Analysis) countermeasure. Notably, this can also be used to generate the checksum in parallel if an implementation with high performance is needed (e.g. several CPU core are used in parallel to calculate the contribution for different n). It should be noted that from the original recursive sum definition of a Fletcher-X or ATN-32 checksum, corresponding to the iterative definition for $CS_{k+1}$ given above, it is not visible that the contributions of the different data elements can be accumulated in random order. Neither it is obvious from the original recursive definition (1) how the weight coefficients $c_{j,n}$ and $b_{j,i}$ given in (2) have to be computed.

The checksum calculation block further calculates the contributions of the initial values $$\sum_{i=0}^{j} \binom{N-1+j-i}{j-i} a_i$$

(before or after or during the calculation of the contributions of the data elements) and adds them to the contributions of the data elements to generate the checksum elements $S_0, S_1, S_2, S_3, \ldots, S_k$. This may for example be done in an interleaved manner with the accumulation of the contributions of the data elements.

It should be noted that if SCA counter measure a) is not used, the checksum calculation block 203 may calculate the checksum elements iteratively according to the definition for $CS_{k+1}$ given above.

It may be desirable to correct the checksum, i.e. to remove the dependency of the initial values, of the constant mask m or the individual masks $m_n$. In various embodiments, in case of the SCA countermeasure d), i.e. in case of the usage of individual masks the removal of the contributions of the individual masks $m_n$ may be desirable to avoid the necessity for storage of the masks $m_n$ for later checking of the checksum.

Therefore, the checksum calculation may include a checksum correction block 205 which may remove one or all of the contributions of the initial values, the constant mask m or the individual masks $m_n$. and generates corrected (or final) checksum values $\hat{S}_j$.

For removing the contributions of the initial values, the checksum correction block 205 may calculate the terms $$\binom{N-1+j-i}{j-i} a_i$$

(i.e. the terms of the second sum of the representation (2) based on binomial coefficients containing the values $a_i$), calculate the sum $$\sum_{i=0}^{j} \binom{N-1+j-i}{j-i} a_i$$

and subtract it from $S_j$ for all $j=0, \ldots, k$.

For SCA counter measure c), i.e. usage of a constant mask m, the correction for the jth checksum value $S_j$ is given by $$\sum_{n=0}^{N-1} \binom{N-1+j-n}{j} m$$

and the checksum correction block 205 can subtract it from $S_j$ accordingly.

For SCA counter measure d) (shared data), the masked vector $D'=(D'_0, D'_1, \ldots D'_{N-1})$ is supplied to the checksum correction block 205 and, in addition to the checksum values $$S_0(Dj), S_1(Dj), S_2(Dj), S_3(Dj), \ldots \text{ for } 0<=n<N$$

calculated by the checksum calculation block 203, the checksum correction block 205 calculates correction values.

$$S_0(D'j), S_1(D'j), S_2(D'j), S_3(D'j), \ldots \text{ for } 0<=n<N$$

(in other words, the checksum values are computed separately for the shares $D_n$ and $D'_n$).

A checksum value may then be corrected by subtracting the respective correction value such that the corrected checksum values (or final digest values) are given by $$\hat{S}_0 := S_0(D_j) - S_0(D'_j),$$
$$\hat{S}_1 := S_1(D_j) - S_1(D'_j),$$
$$\hat{S}_2 := S_2(D_j) - S_2(D'_j),$$
$$\ldots$$

It should be noted that to subtract a value from a checksum value is to be understood as the inverse operation to the addition operation used for generating the checksum values.

The generated checksum values or a subset of the generated checksum values may be then stored as a checksum as indicated by a storage block 206, e.g. together with the data $d_0, d_1, d_{N-1}$. Further, if the contribution of the mask m or the initial values has not been removed from the checksum values, the initial values and the mask m, respectively, may also be stored to allow later checking of the checksum.

The stored checksum may then be used for checking whether data has been altered. For example, if data elements $d'_0, d'_1, \ldots, d'_{N-1}$ are read or received which are supposed to be equal to $d_0, d_1, \ldots, d_{N-1}$, a second checksum may be calculated similarly to the way the stored checksum has been calculated as explained with reference to FIG. 2 and the second checksum may be compared with the stored checksum to detect whether the data elements $d'_0, d'_1, \ldots, d'_{N-1}$ differ from $d_0, d_1, \ldots, d_{N-1}$, e.g. as a result of an attack on, e.g., the chip card module 102.

Figure 3:
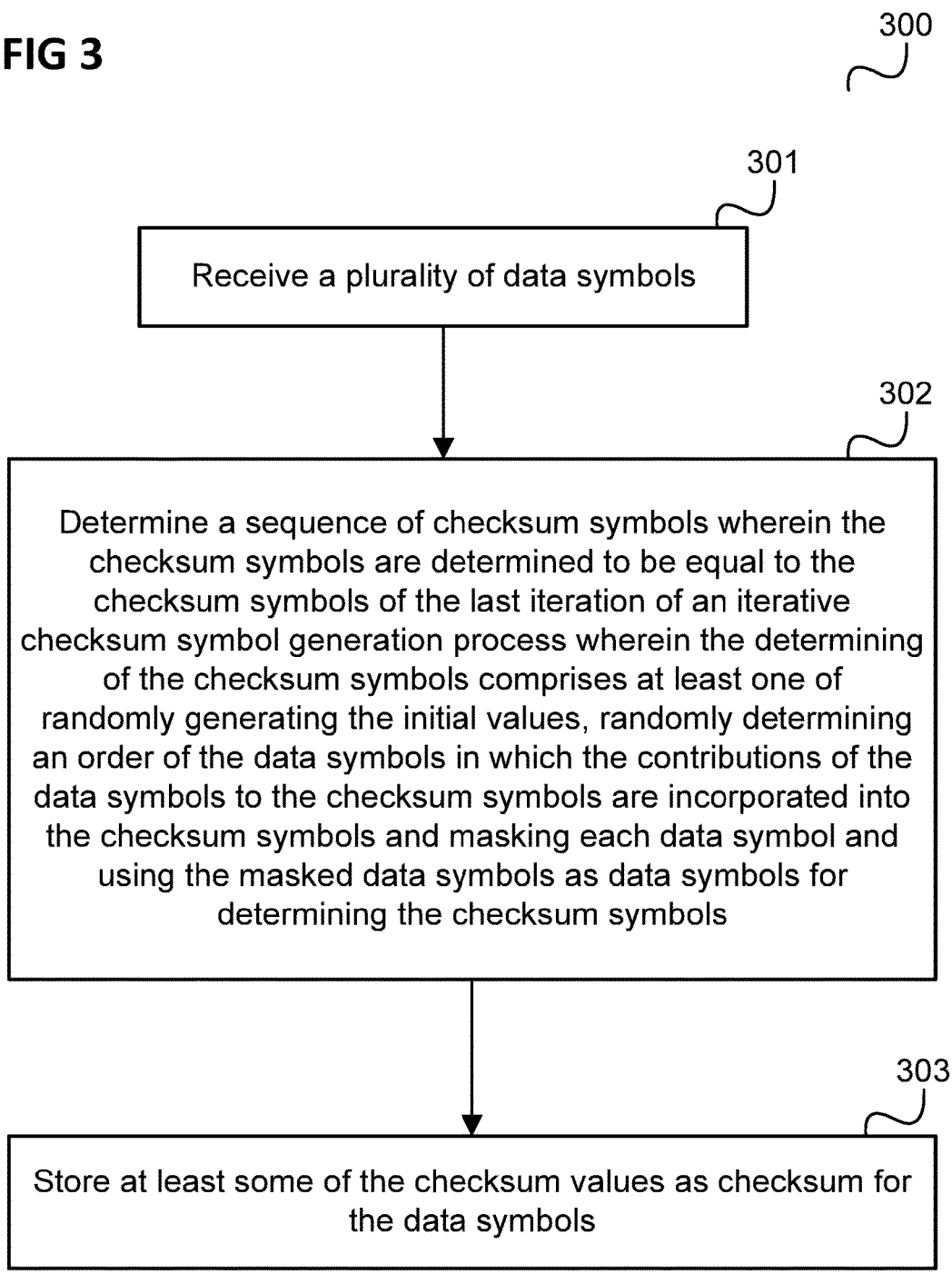
FIG. 3 shows a flow diagram illustrating a method for protecting data according to an embodiment.

Generally, according to various embodiments, a method for protecting data is provided as illustrated in FIG. 3.

FIG. 3 shows a flow diagram 300 according to an embodiment.

In 301, a plurality of data symbols is received.

In 302, a sequence of checksum symbols is determined wherein the checksum symbols are determined to be equal to the checksum symbols of the last iteration of an iterative checksum symbol generation process in which for the first iteration, the value of the first checksum symbol is given by an initial value of the first checksum symbol plus the value of the first data symbol; the value of each following checksum symbol is given by an initial value for the checksum symbol plus the value of the previous checksum symbol for the first iteration; for each following iteration, the value of each checksum symbol is given by the value of the checksum symbol for the previous iteration plus the value of the previous checksum symbol for the current iteration.

The determining of the checksum symbols includes at least one of
randomly generating the initial values,
randomly determining an order of the data symbols in which the contributions of the data symbols to the checksum symbols are incorporated into the checksum symbols
masking each data symbol with and using the masked data symbols as data symbols for determining the checksum symbols which may include at least one of
masking each data symbol with a predetermined random value and using the masked data symbols as data symbols for determining the checksum symbols;
masking each data symbol with an independent random value and using the masked data symbols as data symbols for determining the checksum symbols.

In 303, at least some of the checksum values are stored as checksum for the data symbols.

In other words, in a checksum generation process such as defined above by equations (1) at least one of the side channel counter measures random generation of initial values, random determination of an order in which the contributions of data symbols to checksum symbols are incorporated into the checksum symbols and masking each data symbol with a mask before determining its contribution to the checksums symbols and incorporating it into the checksum symbols.

Figure 4:
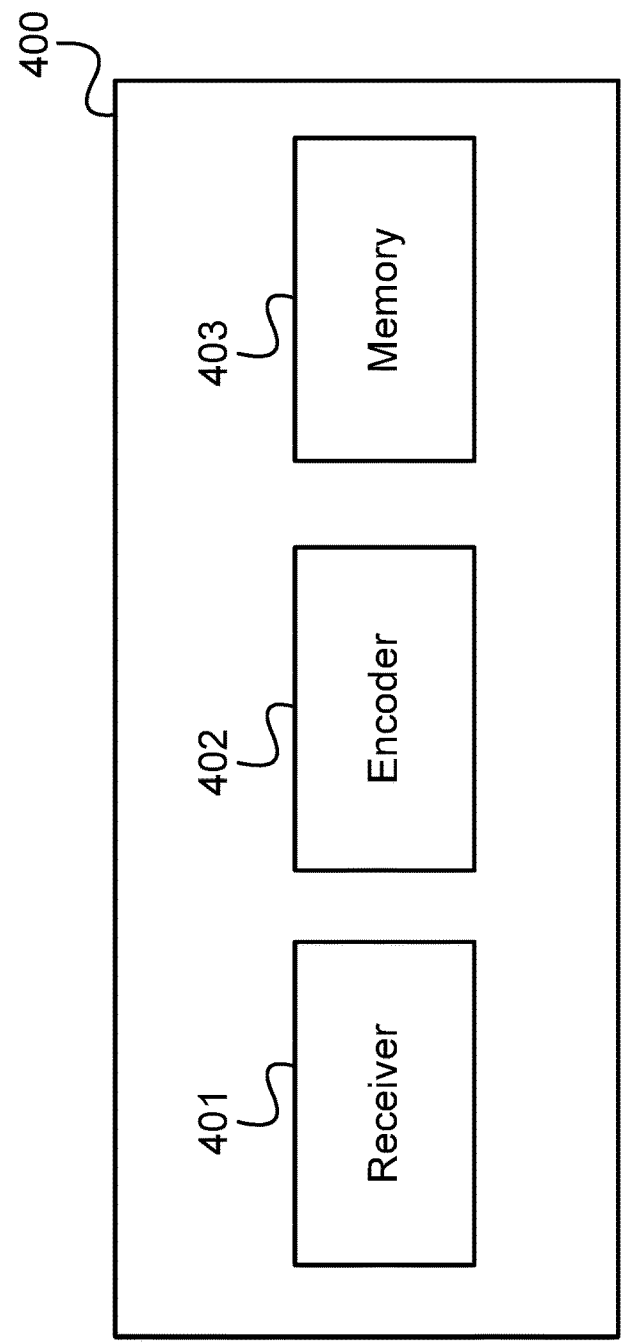
FIG. 4 shows a data processing device according to an embodiment.

According to one embodiment, a data processing device as illustrated in FIG. 4 is provided.

FIG. 4 shows a data processing device 400 according to an embodiment.

The data processing device 400 includes a receiver 401 configured to receive a plurality of data symbols.

Further, the data processing device 400 includes an encoder 402 configured to determine a sequence of checksum symbols wherein the checksum symbols are determined to be equal to the checksum symbols of the last iteration of an iterative checksum symbol generation process in which
for the first iteration,
the value of the first checksum symbol is given by an initial value of the first checksum symbol plus the value of the first data symbol;
the value of each following checksum symbol is given by an initial value for the checksum symbol plus the value of the previous checksum symbol for the first iteration;
for each following iteration,
the value of each checksum symbol is given by the value of the checksum symbol for the previous iteration plus the value of the previous checksum symbol for the current iteration.

The encoder 402 is configured to at least one of randomly generate the initial values, randomly determine an order of the data symbols in which it incorporates the contributions of the data symbols to the checksum symbols into the checksum symbols and mask each data symbol and using the masked data symbols as data symbols for determining the checksum symbols.

The data processing device 400 further includes a memory 403 configured to store at least some of the checksum values as checksum for the data symbols.

Embodiment 1 is a method for protecting data as illustrated in FIG. 3.

Embodiment 2 is a method according to embodiment 1, including independently determining individual masks for the data symbols.

Embodiment 3 is a method according to embodiment 1 or 2, wherein the masks are at least partially different for different data symbols.

Embodiment 4 is a method according to any one of embodiments 1 to 3, wherein the mask is the same mask for all data symbols.

Embodiment 5 is a method according to any one of embodiments 1 to 4, further including removing the contribution of the mask to the checksum values.

Embodiment 6 is a method according to any one of embodiments 1 to 5, including, for each checksum value, determining the contribution of the mask and subtracting the contribution of the mask to the checksum value from the checksum value.

Embodiment 7 is a method according to any one of embodiments 1 to 6, determining includes removing the contribution of the initial values to the checksum values.

Embodiment 8 is a method according to any one of embodiments 1 to 7, including, for each checksum value, determining the contribution of the initial values and subtracting the contribution of the values to the checksum value from the checksum value.

Embodiment 9 is a method according to any one of embodiments 1 to 8, wherein the addition operation is an integer addition modulo a predetermined modulus n, i.e. addition over the set Z/nZ.

Embodiment 10 is a method according to any one of embodiments 1 to 8, wherein the addition operation is over elements in the Galois field GF(q) of q elements.

Embodiment 11 is a method according to any one of embodiments 1 to 8, wherein the addition operation is the multiplication of elements in the Galois field GF(q) of q elements.

Embodiment 12 is a method according to any one of embodiments 1 to 11, wherein the number of iterations is equal to the number of data symbols.

Embodiment 13 is a method according to any one of embodiments 1 to 12, wherein randomly generating the initial values includes randomly generating an initial value for each checksum symbol.

Embodiment 14 is a method according to any one of embodiments 1 to 13, wherein, if determining the checksum symbols includes randomly determining an order (i.e. a permutation) of the data symbols in which the contributions of the data symbols to the checksum symbols are incorporated into the checksum symbols, determining at least one of the checksum symbols further includes determining, for each data symbol, in the randomly determined order of the data symbols, the contribution of the data symbol to the checksum symbol and accumulating the contributions of the data symbols to the checksum symbol to generate the value of the checksum symbol.

Embodiment 15 is a method according to any one of embodiments 1 to 14, including storing the checksum together with the data symbols.

Embodiment 16 is a method according to embodiment 15, further including reading the stored checksum and the data symbols and checking whether the checksum read is valid for the data symbols read.

Embodiment 17 is a method according to embodiment 16, further including computing a further checksum of received data, during or after their transmission, receiving the checksum and checking whether the computed further checksum is valid for the data symbols using the checksum.

Embodiment 18 is a method according to embodiment 16, further including computing a further checksum of received data, during or after their transmission, comparing the computed further checksum with the stored checksum and checking whether the computed further checksum is valid.

Embodiment 19 is a method according to any one of embodiments 1 to 18, wherein the checksum symbols are determined according to a Fletcher-16, a Fletcher-32, an Adler-32, or an ATN-32 checksum.

Embodiment 20 is a data processing device as illustrated in FIG. 4.

It should be noted that embodiments described in context of the method illustrated in FIG. 3 are analogously valid for the data processing device and vice versa.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for protecting data comprising:
   receiving a plurality of data symbols;
   determining a sequence of checksum symbols wherein the checksum symbols are determined to be equal to the checksum symbols of the last iteration of an iterative checksum symbol generation process in which
   for the first iteration,
   the value of the first checksum symbol is given by an initial value of the first checksum symbol plus the value of the first data symbol,
   the value of each following checksum symbol is given by an initial value for the checksum symbol plus the value of the previous checksum symbol for the first iteration,
   for each following iteration,
   the value of each checksum symbol is given by the value of the checksum symbol for the previous iteration plus the value of the previous checksum symbol for the current iteration;
   wherein the determining of the checksum symbols comprises at least one of randomly generating the initial values;
   randomly determining an order of the data symbols in which the contributions of the data symbols to the checksum symbols are incorporated into the checksum symbols;
   masking each data symbol and using the masked data symbols as data symbols for determining the checksum symbols; and
   storing at least some of the checksum values as checksum for the data symbols;
   wherein, if determining the checksum symbols comprises randomly determining an order of the data symbols in which the contributions of the data symbols to the checksum symbols are incorporated into the checksum symbols, determining at least one of the checksum symbols further comprises determining, for each data symbol, in the randomly determined order of the data symbols, the contribution of the data symbol to the checksum symbol and accumulating the contributions of the data symbols to the checksum symbol to generate the value of the checksum symbol.

2. The method of claim 1, further comprising:
   independently determining individual masks for the data symbols.

3. The method of claim 1,
wherein the masks are at least partially different for different data symbols.
4. The method of claim 1,
wherein the mask is the same mask for all data symbols.
5. The method of claim 1, further comprising:
removing the contribution of the mask to the checksum values.
6. The method of claim 1, further comprising:
for each checksum value, determining the contribution of the mask and subtracting the contribution of the mask to the checksum value from the checksum value.
7. The method of claim 1,
wherein determining comprises removing the contribution of the initial values to the checksum values.
8. The method of claim 1, further comprising:
for each checksum value, determining the contribution of the initial values and subtracting the contribution of the values to the checksum value from the checksum value.
9. The method of claim 1,
wherein the addition operation is an integer addition modulo a predetermined modulus.
10. The method of claim 1,
wherein the addition operation is over elements in the Galois field GF(q) of q elements.
11. The method of claim 1,
wherein the addition operation is the multiplication of elements in the Galois field GF(q) of q elements.
12. The method of claim 1,
wherein the number of iterations is equal to the number of data symbols.
13. The method of claim 1,
wherein randomly generating the initial values comprises randomly generating an initial value for each checksum symbol.
14. The method of claim 1, further comprising:
storing the checksum together with the data symbols.
15. The method of claim 14, further comprising:
reading the stored checksum and the data symbols and checking whether the checksum read is valid for the data symbols read.
16. The method of claim 15, further comprising:
computing a further checksum of received data, during or after their transmission, receiving the checksum and checking whether the computed further checksum is valid for the data symbols using the checksum.
17. The method of claim 15, further comprising:
computing a further checksum of received data, during or after their transmission, comparing the computed further checksum with the stored checksum and checking whether the computed further checksum is valid.
18. A data processing device, comprising:
a receiver configured to receive a plurality of data symbols;
an encoder configured to determine a sequence of checksum symbols wherein the checksum symbols are determined to be equal to the checksum symbols of the last iteration of an iterative checksum symbol generation process in which
for the first iteration,
the value of the first checksum symbol is given by an initial value of the first checksum symbol plus the value of the first data symbol,
the value of each following checksum symbol is given by an initial value for the checksum symbol plus the value of the previous checksum symbol for the first iteration,
for each following iteration,
the value of each checksum symbol is given by the value of the checksum symbol for the previous iteration plus the value of the previous checksum symbol for the current iteration;
wherein the encoder is configured to at least one of
randomly generate the initial values;
randomly determine an order of the data symbols in which it incorporates the contributions of the data symbols to the checksum symbols into the checksum symbols;
mask each data symbol and using the masked data symbols as data symbols for determining the checksum symbols; and
a memory configured to store at least some of the checksum values as checksum for the data symbols;
wherein, if the encoder's determining the sequence of checksum symbols comprises randomly determining an order of the data symbols in which the contributions of the data symbols to the checksum symbols are incorporated into the checksum symbols, a determination of at least one of the checksum symbols further comprises determining, for each data symbol, in the randomly determined order of the data symbols, the contribution of the data symbol to the checksum symbol and accumulating the contributions of the data symbols to the checksum symbol to generate the value of the checksum symbol.
19. A method for protecting data comprising:
receiving a plurality of data symbols;
determining a sequence of checksum symbols wherein the checksum symbols are determined to be equal to the checksum symbols of the last iteration of an iterative checksum symbol generation process in which
for the first iteration,
the value of the first checksum symbol is given by an initial value of the first checksum symbol plus the value of the first data symbol,
the value of each following checksum symbol is given by an initial value for the checksum symbol plus the value of the previous checksum symbol for the first iteration,
for each following iteration,
the value of each checksum symbol is given by the value of the checksum symbol for the previous iteration plus the value of the previous checksum symbol for the current iteration;
wherein the determining of the checksum symbols comprises at least one of randomly generating the initial values;
randomly determining an order of the data symbols in which the contributions of the data symbols to the checksum symbols are incorporated into the checksum symbols;
masking each data symbol and using the masked data symbols as data symbols for determining the checksum symbols; and
storing at least some of the checksum values as checksum for the data symbols;
further comprising storing the checksum together with the data symbols;
reading the stored checksum and the data symbols and checking whether the checksum read is valid for the data symbols read; and
computing a further checksum of received data, during or after their transmission, comparing the computed further checksum with the stored checksum and checking whether the computed further checksum is valid.

20. A data processing device, comprising:

a receiver configured to receive a plurality of data symbols;

an encoder configured to determine a sequence of checksum symbols wherein the checksum symbols are determined to be equal to the checksum symbols of the last iteration of an iterative checksum symbol generation process in which for the first iteration, the value of the first checksum symbol is given by an initial value of the first checksum symbol plus the value of the first data symbol, the value of each following checksum symbol is given by an initial value for the checksum symbol plus the value of the previous checksum symbol for the first iteration, for each following iteration, the value of each checksum symbol is given by the value of the checksum symbol for the previous iteration plus the value of the previous checksum symbol for the current iteration;

wherein the encoder is configured to at least one of randomly generate the initial values;

randomly determine an order of the data symbols in which it incorporates the contributions of the data symbols to the checksum symbols into the checksum symbols;

mask each data symbol and using the masked data symbols as data symbols for determining the checksum symbols; and a memory configured to store at least some of the checksum values as checksum for the data symbols;

wherein the encoder is further configured to store the checksum together with the data symbols;

read the stored checksum and the data symbols and check whether the checksum read is valid for the data symbols read; and compute a further checksum of received data, during or after their transmission, compare the computed further checksum with the stored checksum and check whether the computed further checksum is valid.

* * * * *